US007429304B2

(12) United States Patent
McNamara, Jr. et al.

(10) Patent No.: US 7,429,304 B2
(45) Date of Patent: Sep. 30, 2008

(54) HIGH-SPEED APPARATUS AND METHOD FOR FORMING INFLATED CHAMBERS

(75) Inventors: Dennis F. McNamara, Jr., Charlestown, NH (US); Charles R. Sperry, Northampton, MA (US); Suzanne M. Scott, Springfield, VT (US)

(73) Assignee: Sealed Air Corporation, Saddle Brook, NJ (US)

( * ) Notice: Subject to any disclaimer, the term of this patent is extended or adjusted under 35 U.S.C. 154(b) by 554 days.

(21) Appl. No.: 11/181,136

(22) Filed: Jul. 14, 2005

(65) Prior Publication Data

US 2006/0289108 A1 Dec. 28, 2006

Related U.S. Application Data

(60) Provisional application No. 60/588,104, filed on Jul. 15, 2004.

(51) Int. Cl.
*B32B 37/00* (2006.01)

(52) U.S. Cl. ........................ 156/145; 156/147; 156/498

(58) Field of Classification Search ................. 156/147, 156/145, 498
See application file for complete search history.

(56) References Cited

U.S. PATENT DOCUMENTS

| | | | | |
|---|---|---|---|---|
| 2,265,075 | A | 12/1941 | Knuetter | |
| 2,718,105 | A | 9/1955 | Ferguson et al. | |
| 3,096,919 | A * | 7/1963 | Synder | 226/3 |
| 3,199,671 | A | 8/1965 | Davy | |
| 3,319,538 | A | 5/1967 | Bodolay et al. | |
| 3,462,913 | A | 8/1969 | Bodolay et al. | |
| 3,546,433 | A | 12/1970 | Ewing et al. | |
| 3,596,428 | A | 8/1971 | Young et al. | |
| 3,735,551 | A | 5/1973 | Pratt | |
| 3,908,881 | A * | 9/1975 | McCann | 226/19 |
| 3,938,298 | A | 2/1976 | Luhman et al. | |
| 4,017,351 | A | 4/1977 | Larson et al. | |
| 4,169,002 | A | 9/1979 | Larson | |
| 4,201,031 | A | 5/1980 | Wiles | |
| 4,384,442 | A | 5/1983 | Pendleton | |
| 4,448,011 | A | 5/1984 | Pohl | |

(Continued)

FOREIGN PATENT DOCUMENTS

DE 199 13 408 A1 3/1999

(Continued)

OTHER PUBLICATIONS

The European Search Report for European Application No. 05015264.4; Filed Jul. 13, 2005; Date of Completion Feb. 27, 2006.

*Primary Examiner*—Jeff H Aftergut
(74) *Attorney, Agent, or Firm*—Alston & Bird LLP

(57) ABSTRACT

An apparatus and a method for inflating an inflatable web in which, in one embodiment, the inflatable web is conveyed along a path of travel with an inflation element positioned between unsealed edges of the web and proximate the inflation ports of the web's inflatable chambers, and a tracking sensor is used to detect the transverse position of the web with respect to the inflation element. A web tracking system is employed to continually adjust the transverse position of the web to maintain it within a predetermined range with respect to the inflation element. In this manner, the consistency of inflation of the inflatable chambers is improved.

15 Claims, 12 Drawing Sheets

U.S. PATENT DOCUMENTS

| | | | | |
|---|---|---|---|---|
| 4,512,136 | A | | 4/1985 | Christine |
| 4,545,180 | A | | 10/1985 | Chung et al. |
| 4,631,901 | A | | 12/1986 | Chung et al. |
| 4,674,268 | A | | 6/1987 | Gavronsky et al. |
| 4,869,048 | A | | 9/1989 | Boeckmann |
| 4,893,453 | A | | 1/1990 | Weikert |
| 4,999,975 | A | | 3/1991 | Willden et al. |
| 5,042,663 | A | | 8/1991 | Heinrich |
| 5,067,301 | A | | 11/1991 | Shore |
| 5,070,675 | A | | 12/1991 | Chuan-Shiang |
| 5,080,747 | A | | 1/1992 | Veix |
| 5,181,365 | A | | 1/1993 | Garvey et al. |
| 5,187,917 | A | | 2/1993 | Mykleby |
| 5,210,993 | A | | 5/1993 | Van Boxtel |
| 5,216,868 | A | | 6/1993 | Cooper et al. |
| 5,254,074 | A | | 10/1993 | Landers et al. |
| 5,308,008 | A | | 5/1994 | Ruëgg |
| 5,337,539 | A | | 8/1994 | Barton |
| 5,339,602 | A | | 8/1994 | Landers et al. |
| 5,353,573 | A | | 10/1994 | Durrant |
| 5,357,733 | A | | 10/1994 | Weikert |
| 5,427,830 | A | | 6/1995 | Pharo |
| 5,441,345 | A | | 8/1995 | Garvey et al. |
| 5,454,642 | A | | 10/1995 | De Luca |
| 5,552,003 | A | | 9/1996 | Hoover et al. |
| 5,581,983 | A | | 12/1996 | Murakami |
| 5,660,662 | A | | 8/1997 | Testone |
| 5,664,738 | A | | 9/1997 | Fife |
| 5,679,208 | A | | 10/1997 | Sperry et al. |
| 5,687,545 | A | | 11/1997 | Baker |
| 5,693,163 | A | | 12/1997 | Hoover et al. |
| 5,699,653 | A | | 12/1997 | Hartman et al. |
| 5,722,217 | A | | 3/1998 | Cloud |
| 5,727,370 | A | | 3/1998 | Sperry |
| 5,733,045 | A | | 3/1998 | Jostler et al. |
| 5,755,082 | A | | 5/1998 | Takahashi et al. |
| 5,824,392 | A | | 10/1998 | Gotoh et al. |
| 5,845,463 | A | | 12/1998 | Henaux |
| 5,862,653 | A | | 1/1999 | Solano |
| 5,873,215 | A | | 2/1999 | Aquarius et al. |
| 5,875,610 | A | | 3/1999 | Yuyama et al. |
| 5,918,441 | A | | 7/1999 | Baker |
| 5,937,614 | A | | 8/1999 | Watkins et al. |
| 5,942,076 | A | | 8/1999 | Salerno et al. |
| RE36,501 | E | | 1/2000 | Hoover et al. |
| 6,035,611 | A | | 3/2000 | Lerner |
| 6,058,681 | A | | 5/2000 | Recchia, Jr. |
| RE36,759 | E | | 7/2000 | Hoover et al. |
| 6,145,273 | A | | 11/2000 | Baker |
| 6,410,119 | B1 | | 6/2002 | De Luca et al. |
| 6,453,644 | B1 | | 9/2002 | Baker |
| 6,550,229 | B2 | | 4/2003 | Sperry et al. |
| 6,651,406 | B2 | | 11/2003 | Sperry et al. |
| 6,786,022 | B2 | | 9/2004 | Fuss et al. |
| 6,804,933 | B2 | | 10/2004 | Sperry et al. |
| 7,165,375 | B2 | * | 1/2007 | O'Dowd ........................ 53/96 |
| 2002/0102352 | A1 | | 8/2002 | Sperry et al. |
| 2002/0150730 | A1 | | 10/2002 | De Luca et al. |
| 2002/0166788 | A1 | * | 11/2002 | Sperry et al. ................ 206/522 |
| 2004/0206050 | A1 | | 10/2004 | Fuss et al. |
| 2005/0188659 | A1 | | 9/2005 | Lerner et al. |
| 2006/0086064 | A1 | | 4/2006 | Wehrmann |
| 2006/0090421 | A1 | | 5/2006 | Sperry et al. |
| 2006/0174589 | A1 | | 8/2006 | O'Dowd |

FOREIGN PATENT DOCUMENTS

| | | | |
|---|---|---|---|
| DE | 199 13 410 | A1 | 3/1999 |
| EP | 0 798 250 | | 10/1997 |
| EP | 1 013 573 | | 6/2000 |
| EP | 1 386 841 | | 2/2004 |
| GB | 1 015 642 | | 1/1966 |
| JP | 02 169448 | | 6/1990 |
| WO | WO 00/53501 | | 9/2000 |
| WO | WO 00/64672 | | 11/2000 |
| WO | WO 01/53153 | A1 | 7/2001 |
| WO | WO 01/74686 | A2 | 10/2001 |
| WO | WO 02/14156 | A1 | 2/2002 |

* cited by examiner

Fig. 9.
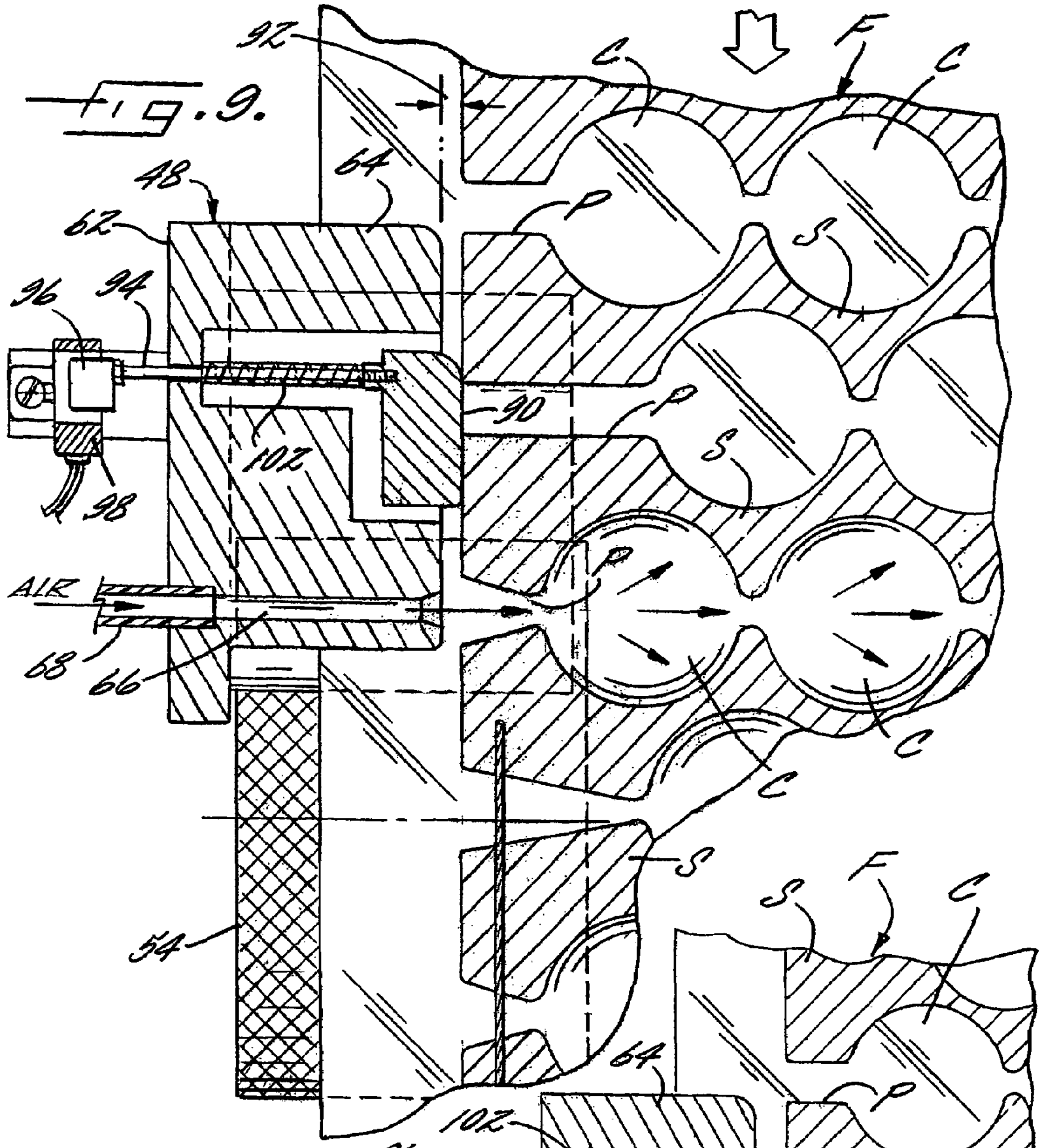
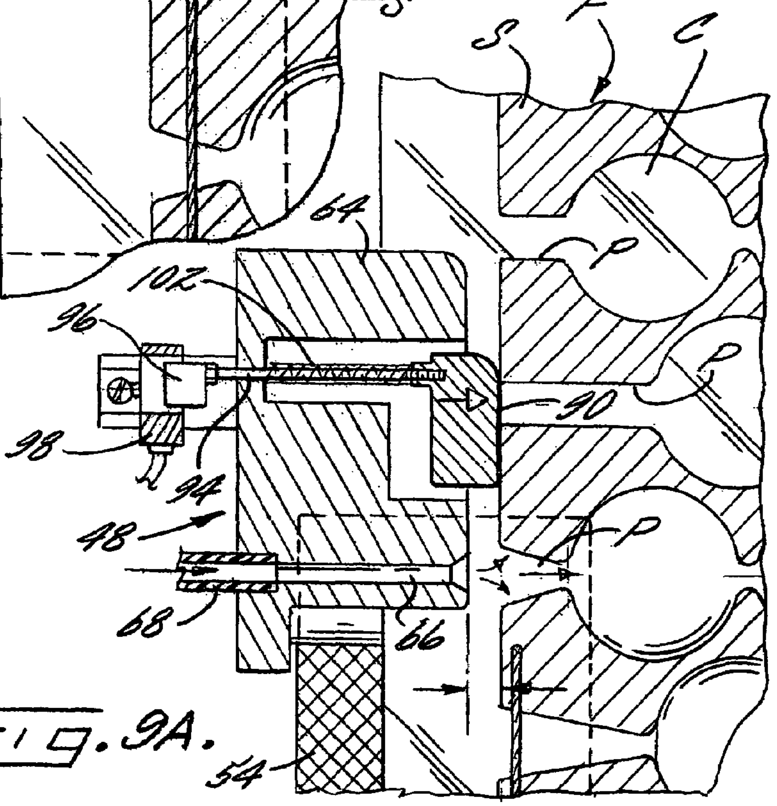
Fig. 9A.

Fig. 14.
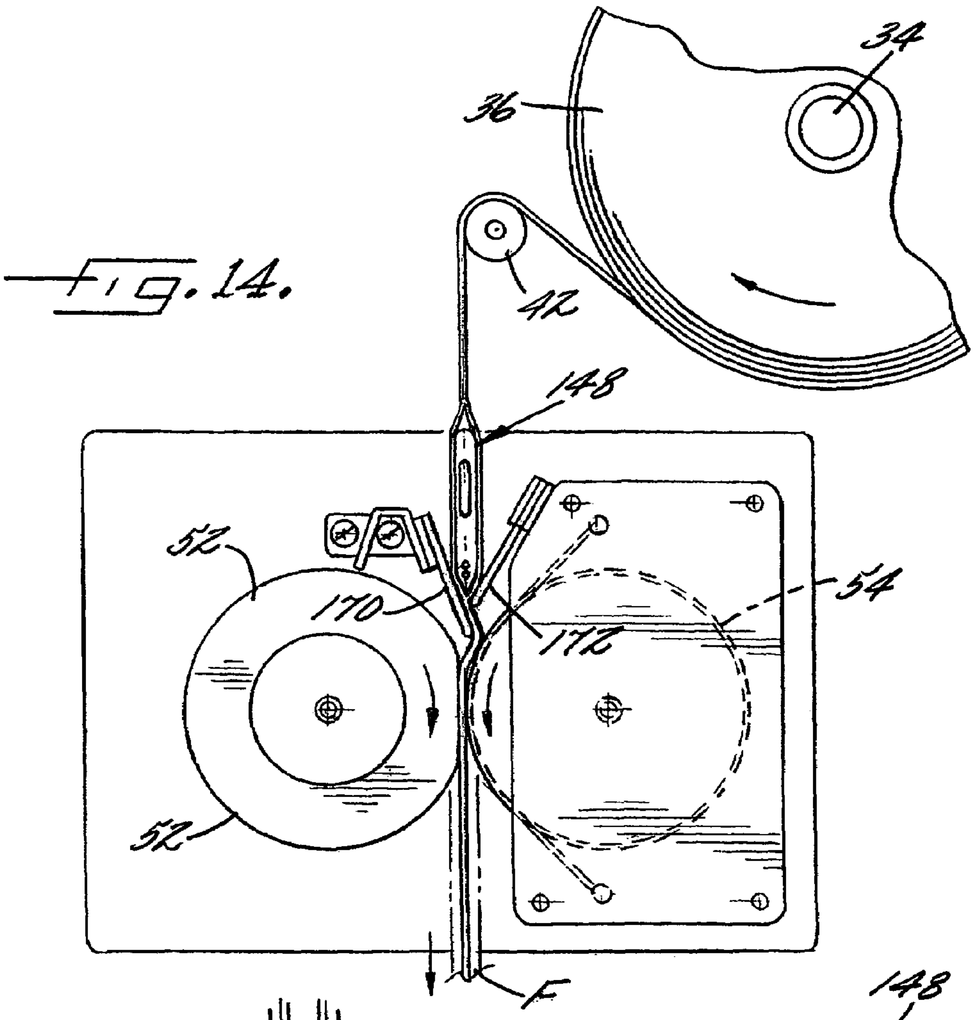
Fig. 14A.
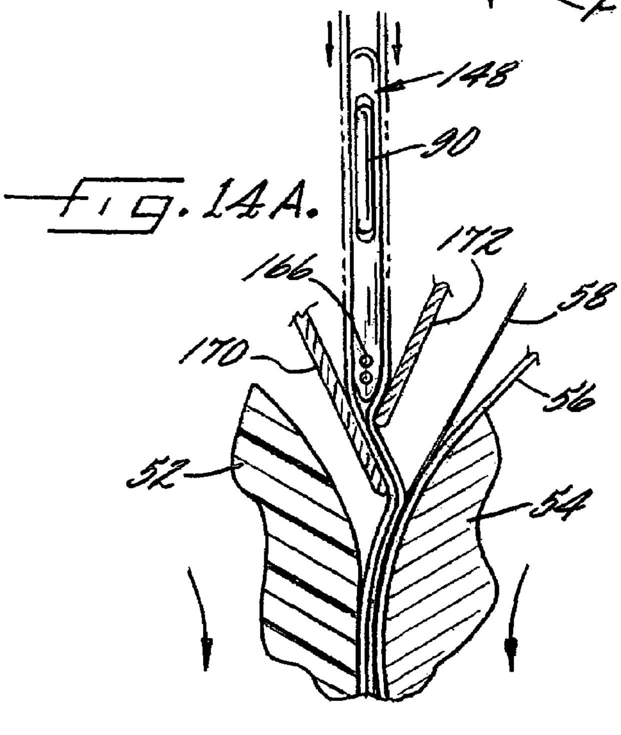
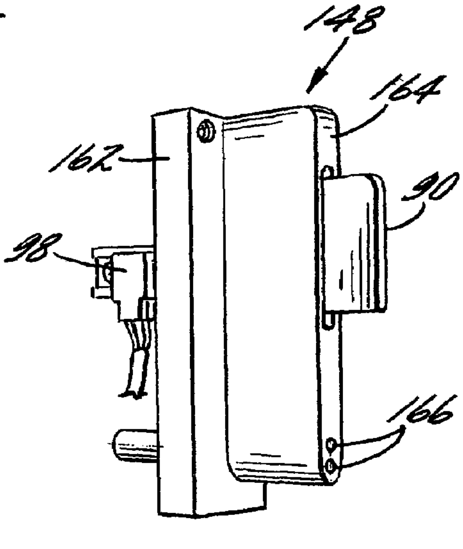
Fig. 15.

HIGH-SPEED APPARATUS AND METHOD FOR FORMING INFLATED CHAMBERS

CROSS-REFERENCE TO RELATED APPLICATIONS

This application claims the benefit of the filing date of U.S. Provisional Patent Application Ser. No. 60/588,104 filed Jul. 15, 2004, the entire disclosure of which is incorporated herein by reference.

BACKGROUND OF THE INVENTION

The present invention relates to inflatable webs that can be inflated to provide gas-inflated chambers for cushioning purposes. More particularly, this invention relates to an apparatus and method for inflating the inflatable webs.

Air cellular cushioning materials are commonly used to protect articles during shipment. One such product is BUBBLE WRAP® air cellular cushioning material sold by Sealed Air Corporation. Air cellular cushioning material is generally prepared at a production plant and shipped in rolls to distributors and end users. Since the rolls comprise a substantial amount of air in the cells of the material, the rolls are bulky, such that shipping costs are relatively high. Furthermore, the rolls require substantial space requirements for storage prior to use.

To address these issues, it has been proposed to provide inflatable webs shipped to the end user in a deflated state, and to allow the end user to inflate and seal the webs as needed. In general, such products have not been commercially significant because of the cost and complexity of the inflation equipment that is required. Strides have been made toward simplifying and reducing the cost of the inflation equipment and improving its reliability, as exemplified in co-pending U.S. patent application Ser. No. 10/057,067 filed Jan. 25, 2002, the disclosure of which is incorporated herein by reference. However, further improvements are sought. In particular, it is desired to improve upon the consistency of inflation of the chambers of the inflatable web, and to improve upon the ease of use of the inflation equipment.

BRIEF SUMMARY OF THE INVENTION

The present invention addresses the above needs and achieves other advantages by providing an apparatus and a method for inflating an inflatable web in which, in a first embodiment of the invention, the inflatable web is conveyed along a path of travel with an inflation element positioned between unsealed edges of the web and proximate the inflation ports of the web's inflatable chambers, and a tracking sensor is used to detect the transverse position of the web with respect to the inflation element. A web tracking system is employed to continually adjust the transverse position of the web to maintain it within a predetermined range with respect to the inflation element. In this manner, the consistency of inflation of the inflatable chambers is improved.

In one embodiment, the apparatus includes a tracking sensor comprising a contact sensor arranged to be contacted by the intermittent seals of the inflatable web as the web is conveyed. The tracking sensor provides a signal indicative of the transverse position of the web.

The apparatus in one embodiment includes a roll mounting arrangement structured and arranged for rotatably mounting a roll of the inflatable web such that the roll is movable back and forth in opposite first and second directions, respectively, parallel to a rotation axis of the roll. The web tracking system is structured and arranged to position the roll of the inflatable web in the first and second directions, thereby effecting adjustment of the transverse position of the inflatable web. The movement of the roll can be effected by a pair of actuators respectively mounted adjacent the opposite ends of the roll such that one actuator is activated to move the roll in the first direction and the other actuator is activated to move the roll in the opposite second direction.

The inflation device can comprise a pair of guides between which the edge portions of the two sheets of the inflatable web are received. The inflation element is positioned between the guides such that the edge portion of one sheet passes through a channel defined between one guide and one side of the inflation element and the edge portion of the other sheet passes through another channel between the other guide and an opposite side of the inflation element. Preferably, the guides are mounted on the inflation device so as to be movable toward and away from each other between a web-threading position in which the guides are spaced relatively farther apart and the channels are relatively wide to facilitate threading of the edge portions through the channels, and a production position in which the guides are spaced relatively closer together and the channels are relatively narrow.

Alternatively, in another embodiment, the guides are separate from the inflation device and are structured and arranged to guide the edge portions of the sheets through a non-linear path, which has the effect of stretching the edge portions just upstream of a sealing device that seals the inflatable chambers closed after inflation. In this manner, the guides ensure that the two edge portions have substantially the same length and thereby reduce or eliminate the incidence of folding of one edge portion.

In one embodiment, the inflation element defines an internal passage extending therethrough that has an opening facing the intermittent seals of the inflatable web, and the tracking sensor comprises a contact sensor element movably mounted in the internal passage and protruding out from the opening. The contact sensor element is arranged to be contacted by ends of the intermittent seals such that a position of the contact sensor element indicates the transverse position of the inflatable web. A position sensor, such as an optical sensor, is mounted proximate the contact sensor element and is operable to detect the position of the contact sensor element.

In another embodiment of the invention, the apparatus includes a winding device for winding the inflatable web, after it has been inflated, into a roll. The winding device comprises a rotatable spindle about which the inflatable web is wound, and a motor coupled with the spindle for rotating the spindle. The spindle in one embodiment comprises a hollow generally cylindrical spindle mounted in cantilever fashion such that the spindle has a free end, and the spindle has an axial slot in its wall for receiving an end of the inflatable web to secure the end. The slot allows a completed roll of inflatable web to be axially slid off the distal end of the spindle. In a further embodiment, the spindle is mounted on a pivotable arm, and the winding device further comprises a spring element connected to the arm such that the spring element exerts a force on the arm to urge the inflatable web being wound onto the roll against a surface of the apparatus so as to create tension in the inflatable web as the web is wound onto the roll.

In a further embodiment of the invention, the apparatus comprises a transfer device for transferring the inflatable web from the apparatus to another location. The transfer device comprises an arm mounted to the apparatus and extending outward therefrom, the arm having a free end, a rotatably driven transfer member being mounted to the arm proximate the free end. The transfer member is arranged to frictionally engage the inflatable web such that rotation of the transfer member moves the inflatable web along a path toward the other location.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 9 is a magnified view, along line 9-9 in FIG. 2, showing the inflation device with its inflation element positioned between the edge portions of the web, and illustrating the inflation of an inflatable chamber of the web, with the web in a first transverse position with respect to the inflation device;

FIG. 9A is a view similar to FIG. 9, showing the web in a second transverse position with respect to the inflation device;

FIG. 14 is a view similar to FIG. 2, showing an alternative embodiment of the invention;

FIG. 14A is a magnified view of the web guides of the alternative embodiment;

FIG. 15 is a perspective view of the inflation device of the alternative embodiment;

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
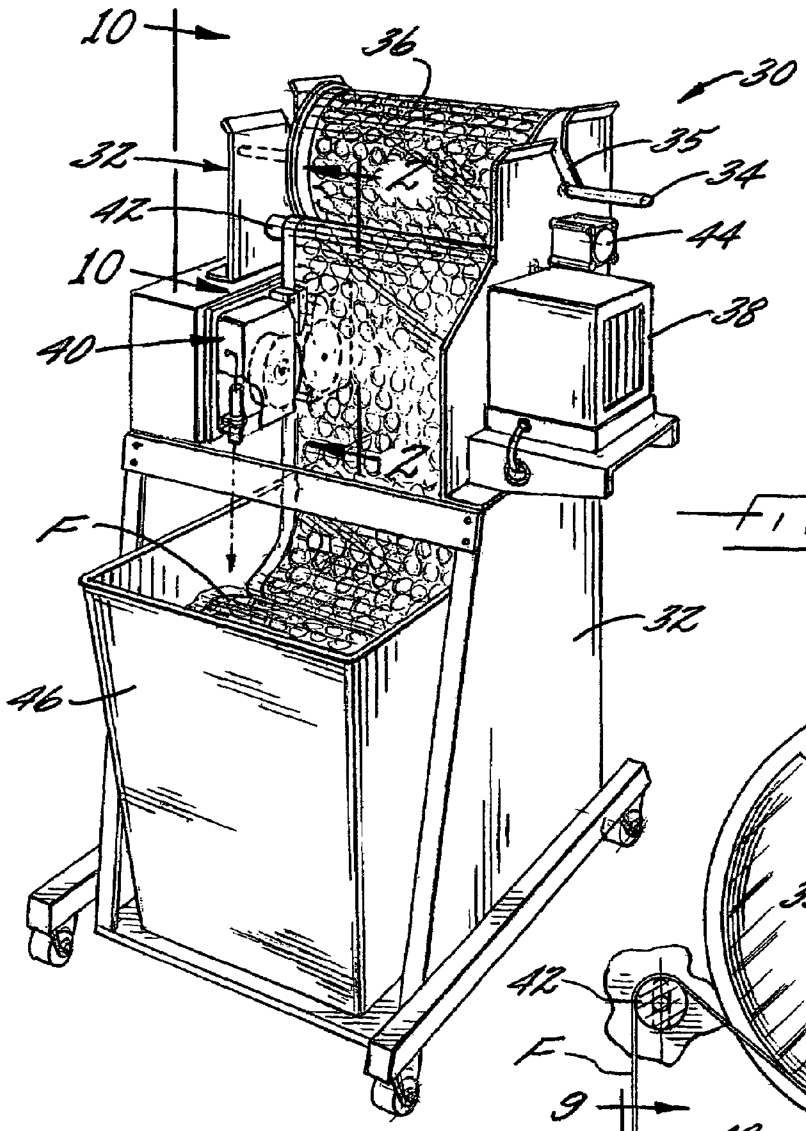
FIG. 1 is a perspective view of an apparatus in accordance with one embodiment of the invention.
Figure 2:
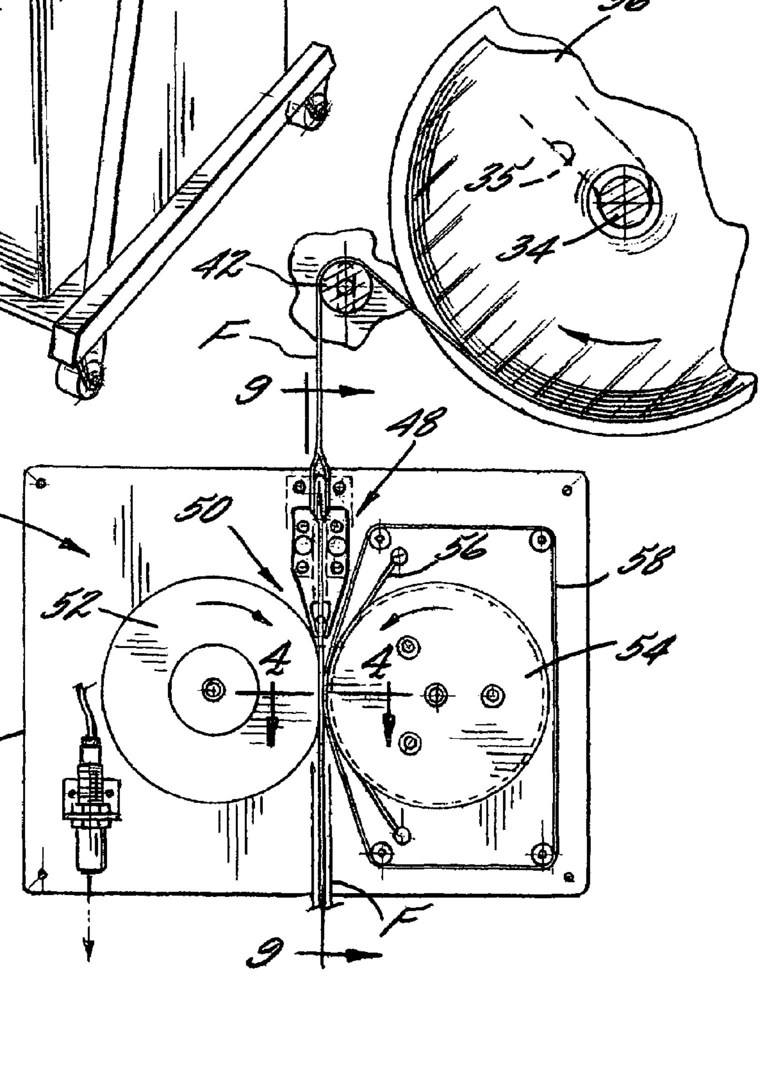
FIG. 2 is a cross-sectional view of the apparatus along line 2-2 in FIG. 1.

With initial reference to FIGS. 1 and 2, there is illustrated an apparatus 30 in accordance with one embodiment of the invention. The apparatus includes a base or frame 32 that supports a film supply spindle 34 on which a supply roll 36 of inflatable web is mounted so that the roll can freely rotate. The apparatus includes an air compressor 38, a drive head 40, a tension control roller 42, two tracking cylinders 44 (only one visible in FIG. 1), a collection bin 46, and electronic and pneumatic controls (not visible in FIG. 1). The apparatus also includes an inflation device 48 for inflating the inflatable web, as further described below.

The drive head 40 is shown in greater detail in FIG. 2. The drive head includes a web drive and sealing device 50 for advancing the inflatable web from the supply roll 36 and for sealing the inflatable web after inflation by the inflation device 48. The web drive and sealing device can comprise a device generally as disclosed in U.S. Pat. No. 6,550,229, the disclosure of which is hereby incorporated herein by reference. The device comprises a resilient drive roller 52 and a grooved drive roller 54 (i.e., a "drive roller" for driving the web) that form a nip through which the unsealed edge portion of the inflatable web passes, as further described below. The rollers 52, 54 are rotatably driven in opposite directions so as to convey the web by frictional engagement. The drive roller 54 has a groove in its outer surface, extending about the circumference of the roller. A heated sealing wire 56 is disposed in the groove and protrudes out from the groove slightly so as to contact the film as it passes through the nip. Unlike the device disclosed in the above-noted '229 patent, the sealing device 50 is modified to include an endless belt 58 (which can be made of TEFLON® polytetrafluoroethylene reinforced with glass fibers) that travels around the grooved drive roller and seal wire, so that the belt 58 is disposed between the seal wire 56 and the web being sealed. The belt functions to diffuse the heat of the seal wire so as to reduce or prevent "hot spots" that could overheat the polymer film of the inflatable web.

Figure 3:
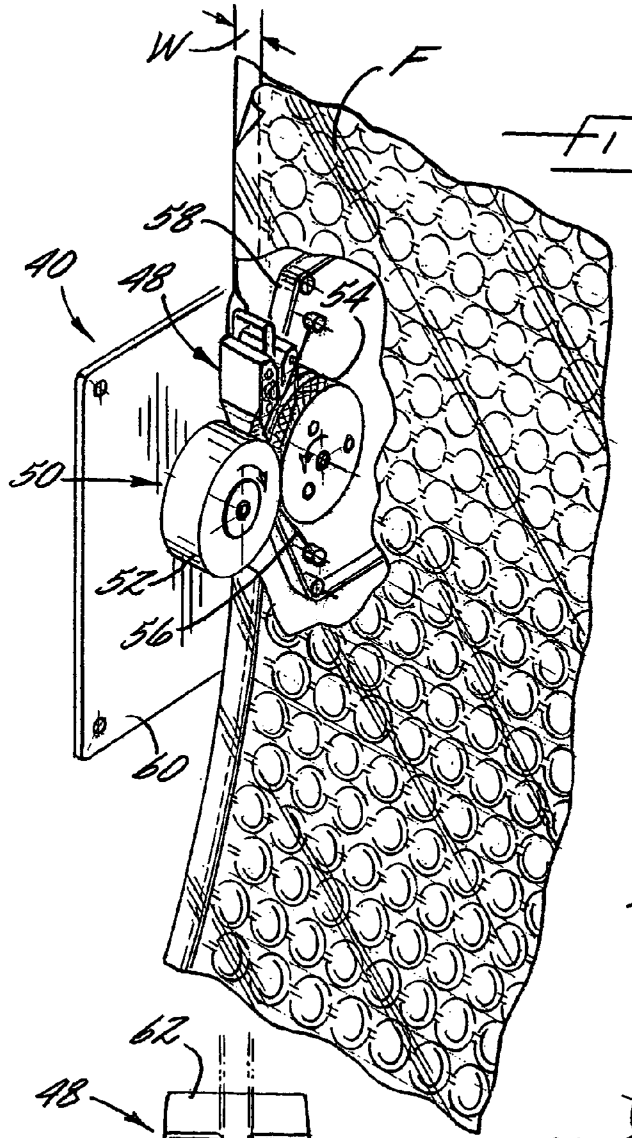
FIG. 3 is a fragmentary perspective view of a portion of the apparatus having the inflation device and sealing device.
Figure 4:
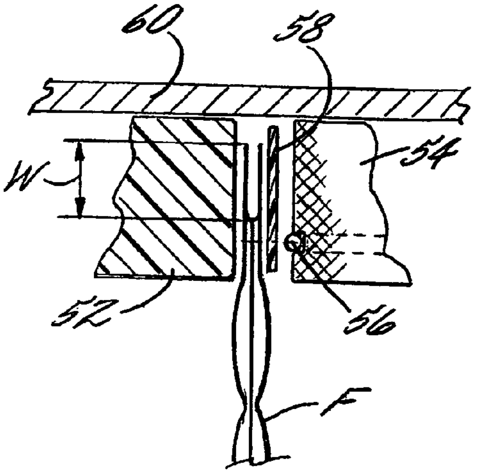
FIG. 4 is a cross-sectional view along line 4-4 in FIG. 2.
Figure 5:
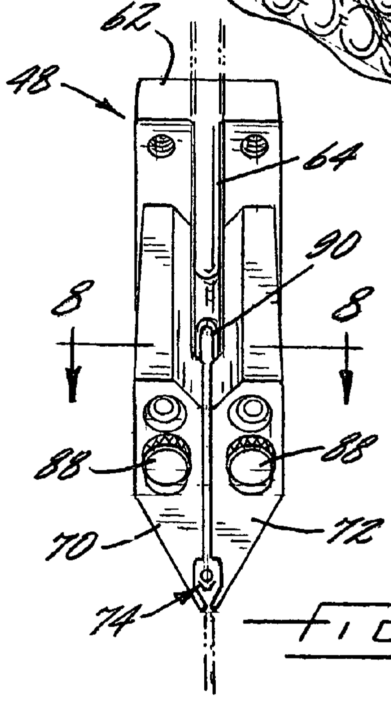
FIG. 5 is a perspective view of the inflation device.
Figure 6:
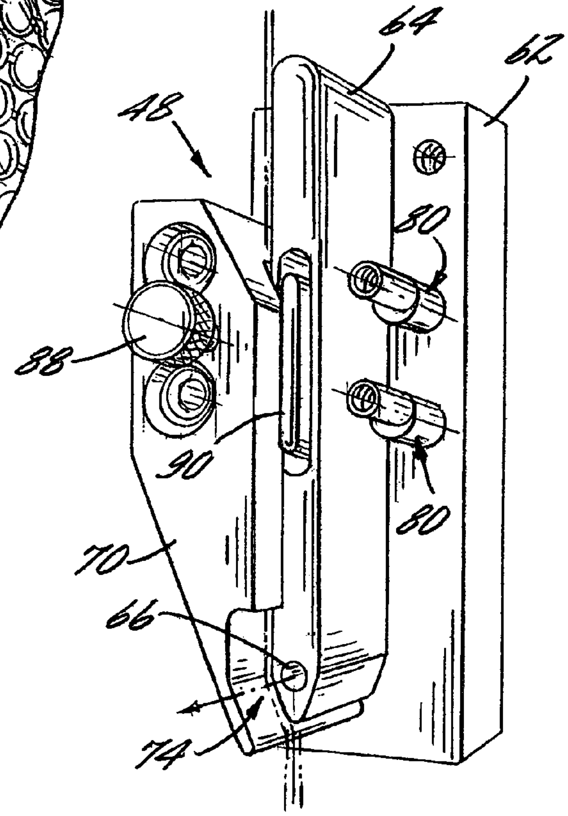
FIG. 6 is a perspective view of the inflation device with one guide removed.
Figure 7:
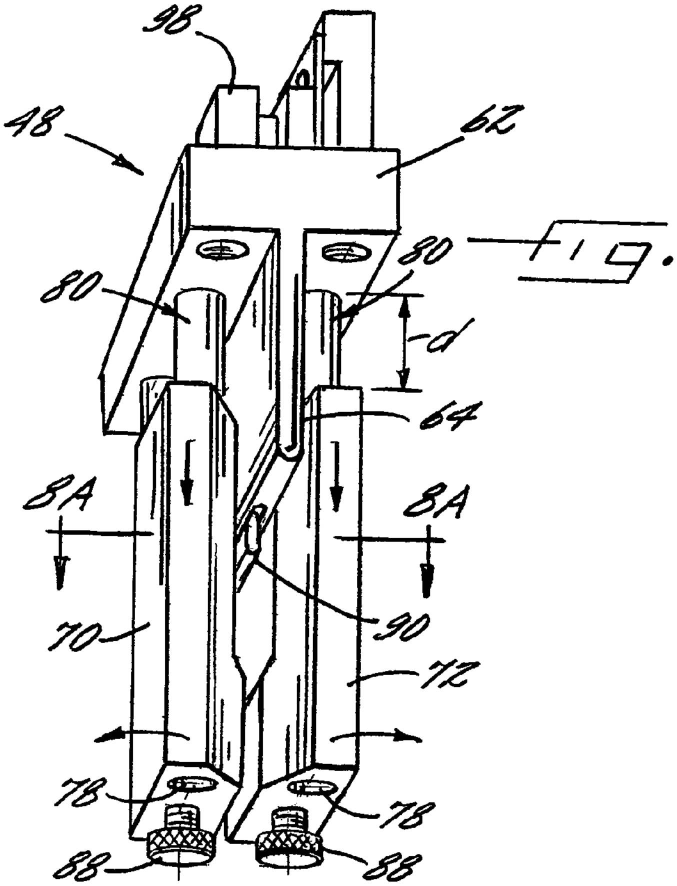
FIG. 7 is a perspective view of the inflation device with the guides in a threading position for facilitating threading of the inflatable web.

FIGS. 3 and 4 illustrate the inflatable web or film F passing through the web drive and sealing device 50. As further described below, the web F has a pair of film portions that are sealed together in a pattern to define inflatable chambers that extend transversely across the width of the web. Each inflatable chamber has relatively wide portions interspersed with relatively narrower portions, the wider portions forming bubbles that are spaced apart across the width of the web. Along one edge of the web the two film portions are unsealed to each other for a width W so that an inflation element of the inflation device 48 can intrude between the two edge portions for inflating the inflatable chambers. The inflation device 48 mounts through the back of a support plate 60 of the drive head 40 and is held in place by screws. The inflation device 48 serves two functions. It replaces the "quill" or flexible inflation nozzle that is disclosed in co-pending U.S. patent application Ser. No. 10/057067, entitled "Apparatus and Method For Forming Inflated Chambers", filed on Jan. 15, 2002, the disclosure of which is hereby incorporated herein by reference. In this function, the inflation device introduces inflation air into each inflatable chamber of the web. The inflation device is also part of a web tracking system that controls the transverse position of the inflatable web relative to the inflation device, thereby insuring consistent filling and sealing of the chambers.

The inflation device 48 is shown in detail in FIGS. 5 through 9A. The device comprises a mounting block 62 from which an integral inflation element or vane 64 projects. The inflation vane 64 is configured to intrude between the unsealed edge portions of the inflatable web. An air channel 66 extends through the block 62 and the vane 64 at a location proximate a trailing edge of the vane and is supplied with inflation air through an air line 68 for inflating the chambers of the web. The inflation device includes a pair of web guides 70, 72 (guide 72 is removed in FIG. 6 for illustrative purposes) mounted on the mounting block 62 on either side of the inflation vane 64. A narrow guide channel is defined between each guide and the adjacent side surface of the inflation vane (see FIG. 8 in particular), for passage of one edge portion of the web through the channel. The purpose of the guides is to closely support the film plies as the as the web is advanced and inflated. This eliminates the fluttering and distortion of the web edge portion during inflation, which could cause wrinkles in the film, making sealing inconsistent. To keep the film stable, the clearances between the guides and inflation vane may be small. For example, the clearance at the bottom can be about 0.010", while the distance between the guide and vane on each side can be about 0.005". These clearances work well with film thickness of 0.0015" per ply. A relieved area 74 (FIG. 6) proximate the trailing edge of the inflation vane allows the web's inflatable chambers to expand during inflation before being closed again when exiting the module and entering the drive rollers. Because the guide channels are so small, it is difficult to load the film between the guides and vane.

Figure 8:
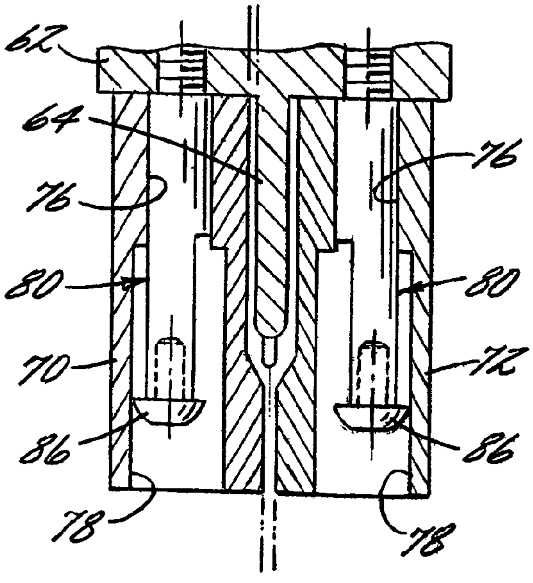
FIG. 8 is a cross-sectional view along line 8-8 in FIG. 5, showing the guides in a production position.
Figure 8A:
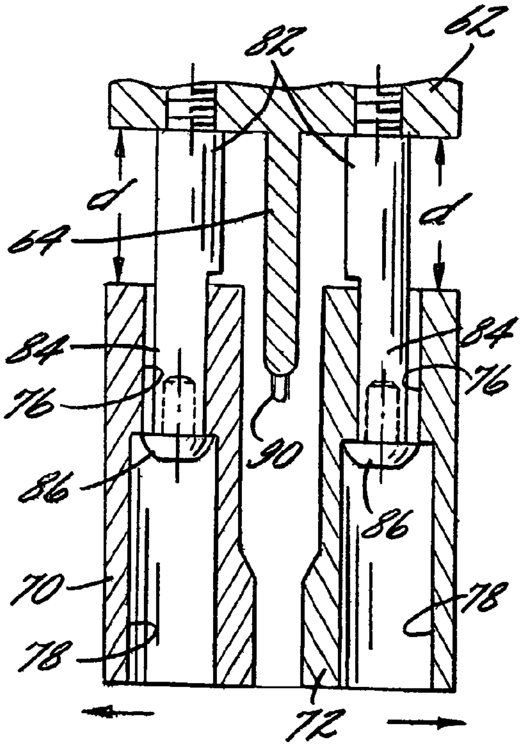
FIG. 8A is a cross-sectional view along line 8A-8A in FIG. 7, showing the guides in the threading position.
Figure 10:
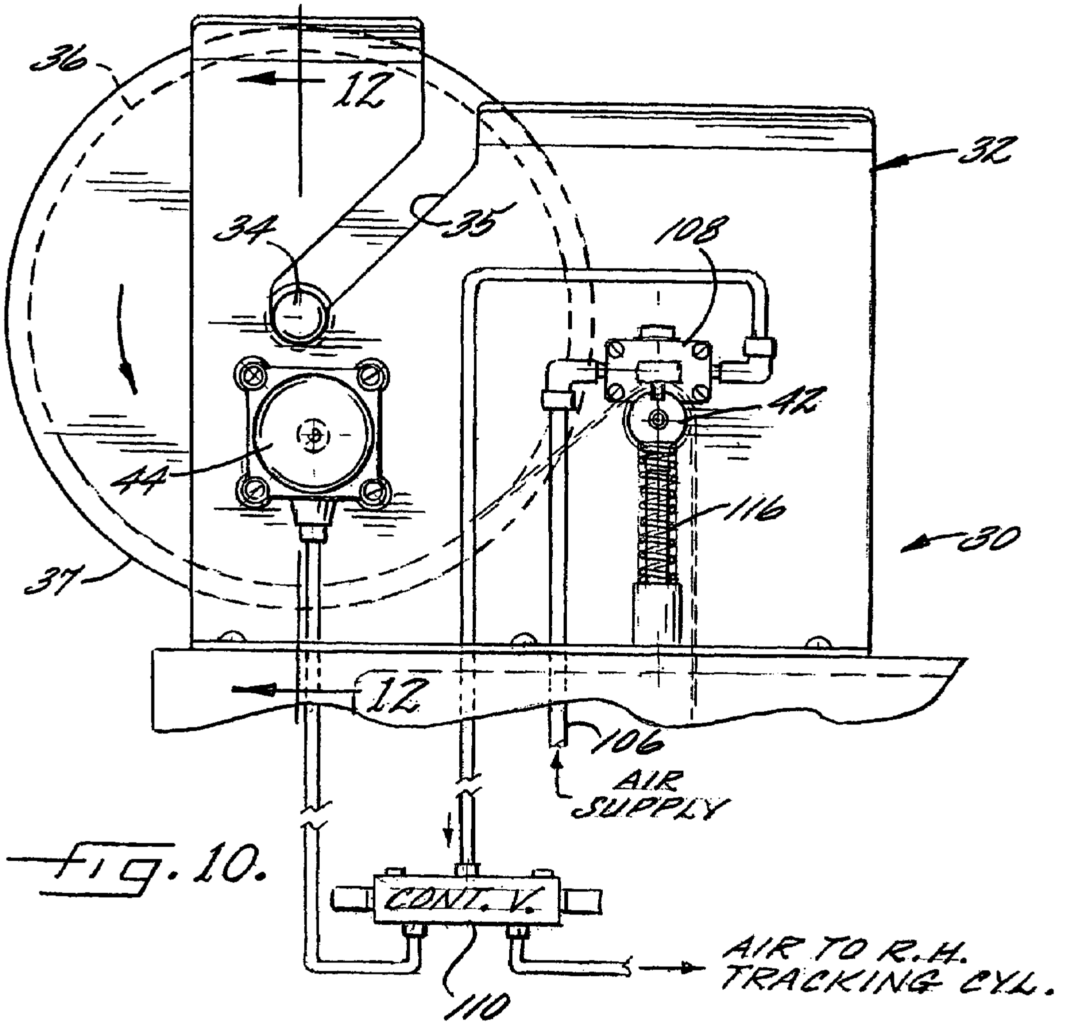
FIG. 10 is a schematic depiction of a portion of the apparatus for adjusting the transverse position (i.e., the "tracking") and the tension of the inflatable web.

Accordingly, to facilitate threading of the edge portions of the web through the channels, the guides 70, 72 are movably mounted on the block 62. More particularly, each of the guides has a pair of spaced bores 76 that extend through the guide, with a larger counter bore section 78 at the distal end of the guide (i.e., the end farthest from the mounting block 62). Affixed on the mounting block on either side of the inflation vane is a pair of mounting studs 80 that are received into the bores 76 of the respective guide 70 or 72. Each of the studs has a large-diameter section 82 adjacent the mounting block and a small-diameter section 84 adjacent the distal end of the stud. The small-diameter sections are eccentrically located relative to the large-diameter sections, such that the small-diameter sections are transversely spaced farther from the inflation vane than are the large-diameter sections. This eccentric arrangement of the small-diameter sections allows the film supply to be loaded into the inflation module. The distal ends of the mounting studs are threaded to accept a retaining screw 86. The counter bore sections 78 are sized to receive the heads of the screws, which are threaded into the ends of the studs so that the guides can slide on the studs for a distance equal to or slightly greater than the length d of the large-diameter sections 82 before the screw heads stop the guides from coming off completely. Knobs 88 are affixed to the guides to allow a convenient grip to pull the guides forward. FIG. 8 shows the two guides 70, 72 in their "production" position for producing inflated air-cellular cushioning material. FIG. 8A shows the guides pulled outward on the studs so the guides are in a "threading" position. When the guides are pulled forward to clear the large-diameter sections of the studs, they can be moved transversely outward on the small-diameter sections, thereby making the channels between the guides and the inflation vane substantially wider to make threading of the web edges easier. Once the web is threaded, the guides are pushed back into their production position (FIG. 8) and the machine can operate.

The inflation device 48 also comprises a web tracking sensor for detecting the transverse position of the web relative to the inflation device. With reference to FIGS. 9 and 9A in particular, the inflatable web has intermittent seals S at which the two films of the web are sealed together so as to define inflatable chambers C that extend across the width of the web and are spaced apart in the length direction along which the web is conveyed through the apparatus. The intermittent seals terminate a distance from the edge of the web to form the unsealed edge portion or skirt of the web, as previously noted. An inflation port P is defined at the end each chamber C proximate the unsealed film skirt. The tracking sensor includes a contact sensor 90 arranged to be contacted by the intermittent seals S as the inflatable web is conveyed. The distance 92 between the distal end of the inflation vane 64 and the inner edge of the film skirt (i.e., the ends of the intermittent seals S) must be controlled to be within a predetermined range for consistent inflation of the chambers C. If this distance becomes too large, excessive air leaks between the inflation port P and the inflatable chamber C, which causes soft bubbles. In the other direction, if the inner edge of the film skirt rubs too hard against the vane 64, binding and distortion occur. The contact sensor 90 rides against the inner edge of the skirt and is movable along the transverse direction. The sensor 90 is attached to one end of a shaft 94 that extends through a bore in the vane 64 and block 62. A detectable element 96 is affixed to the opposite end of the shaft, and a sensor 98 (e.g., an optical sensor such as a slotted optical switch model OBP830W manufactured by Opteck Technology, Inc., of Carrolton, Tex., or a magnetic proximity switch, or the like) is mounted proximate the detectable element. The sensor 98 preferably sends a binary type signal to a controller 100 (FIG. 13) that adjusts the position of the film via a system to be described below; i.e., the signal indicates either that the detectable element has been detected (which means that the web is relatively far to the left as in FIG. 9) or that it has not been detected (which means that the web is relatively far to the right as in FIG. 9A). A spring 102 exerts a minimal force that allows the contact sensor 90 to return to an outward position against the inside edge of the film skirt without imparting a force large enough to influence the position of the film as it is conveyed. As the machine operates and the film advances, the contact sensor 90 retains contact with the inside edge of the film skirt, and moves transversely in response to transverse movement of the web. As the sensor follows the position of the web, the detectable element 96 triggers the sensor 98, alternately turning the switch on and off as the film tracks closer to or farther from the edge of the inflation vane.

The switch signals the controller to make tracking adjustments. The sensor 98 preferably is mounted to the inflation device in a manner permitting its position to be adjusted, which in turn adjusts the "nominal" position of the web relative to the vane.

The system and method for adjusting the transverse position of the web is now described with reference to FIG. 1 and FIGS. 10 through 13. Referring first to FIG. 1, the apparatus frame 32 includes a pair of side plates between which the web supply roll 36 is mounted on the spindle 34, which is placed into slots 35 in the side plates. The supply roll rotates freely on the spindle. The distance between the side plates of the frame is greater than the length of the supply roll (FIG. 12) so that the roll can move back and forth on the spindle. To adjust the tracking position of the web, the supply roll is translated laterally on the spindle. This is accomplished by a pair of pneumatic cylinders 44 respectively mounted to the apparatus frame adjacent each of the opposite ends of the supply roll. The piston rod 45 of each cylinder passes through an opening in the side plate of the frame and the distal end of the rod contacts the adjacent end of the supply roll.

Figure 11A:
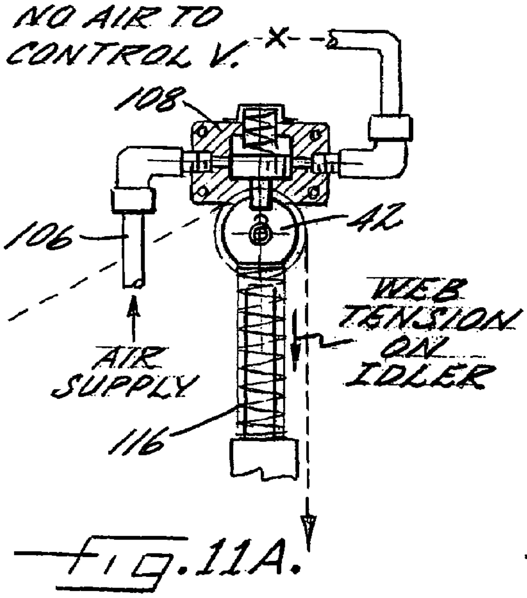
FIG. 11A shows a tension control device in a first condition.
Figure 11B:
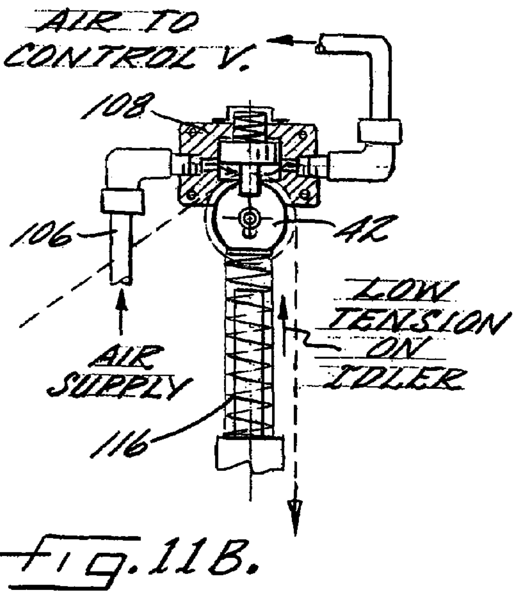
FIG. 11B shows the tension control device in a second condition.
Figure 12:
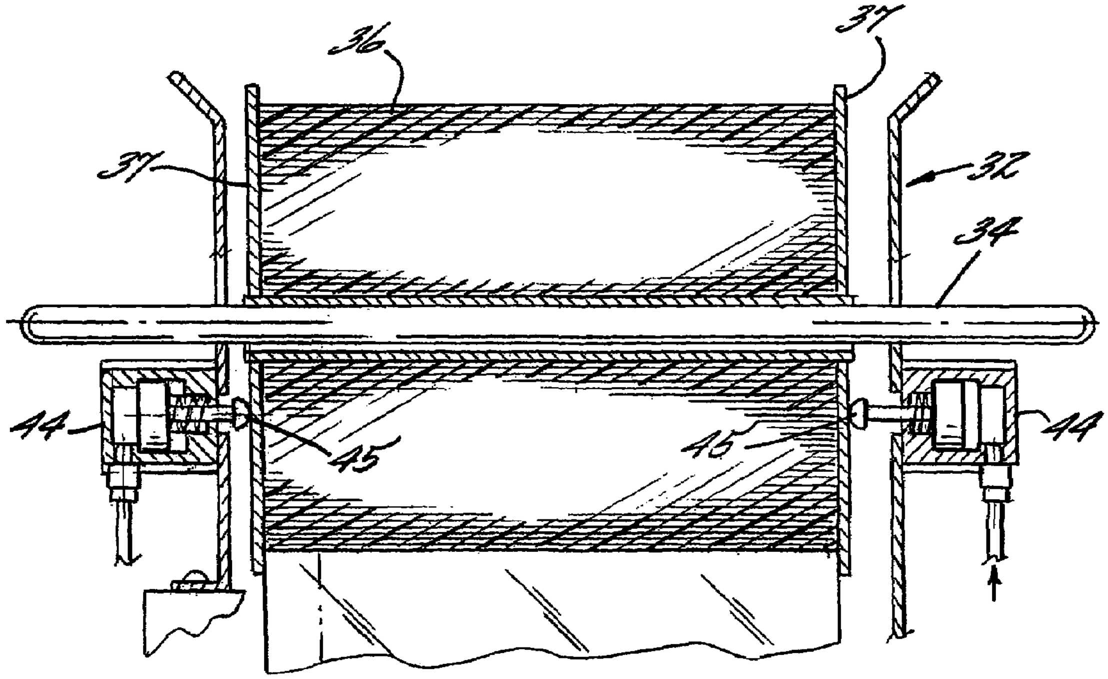
FIG. 12 is a cross-sectional view through the inflatable web supply roll and web tracking adjustment system.
Figure 13:
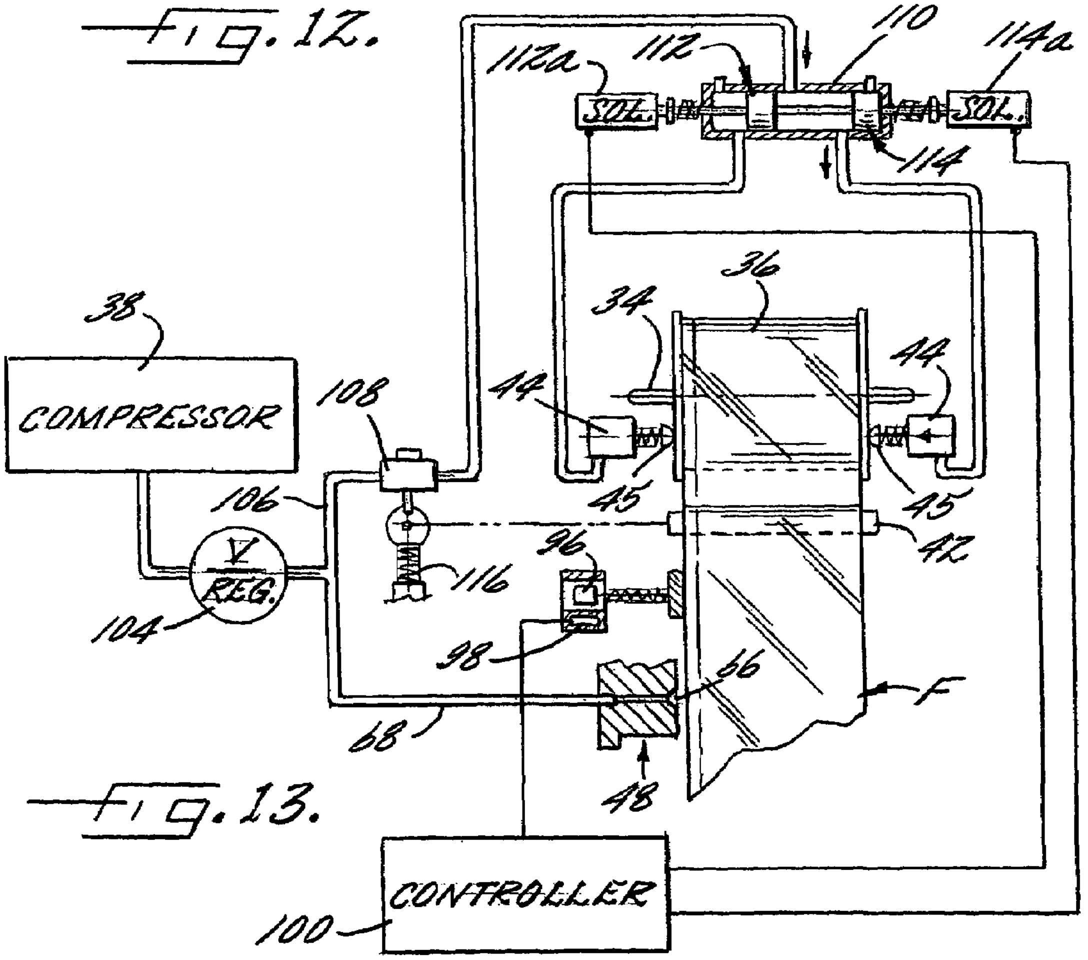
FIG. 13 is a diagrammatic depiction of the web tracking and tension control system.
Figure 16:
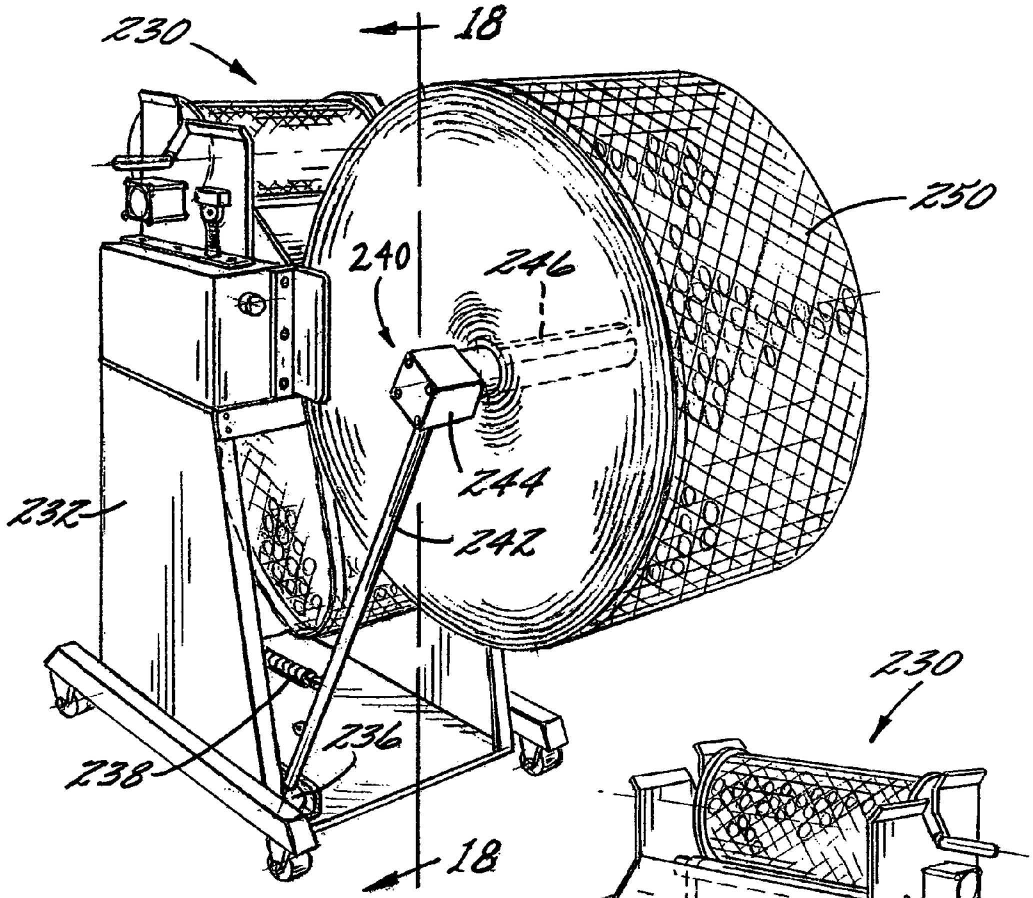
FIG. 16 is a perspective view of an apparatus in accordance with a further embodiment of the invention, having a winding device for the inflated web material.
Figure 17:
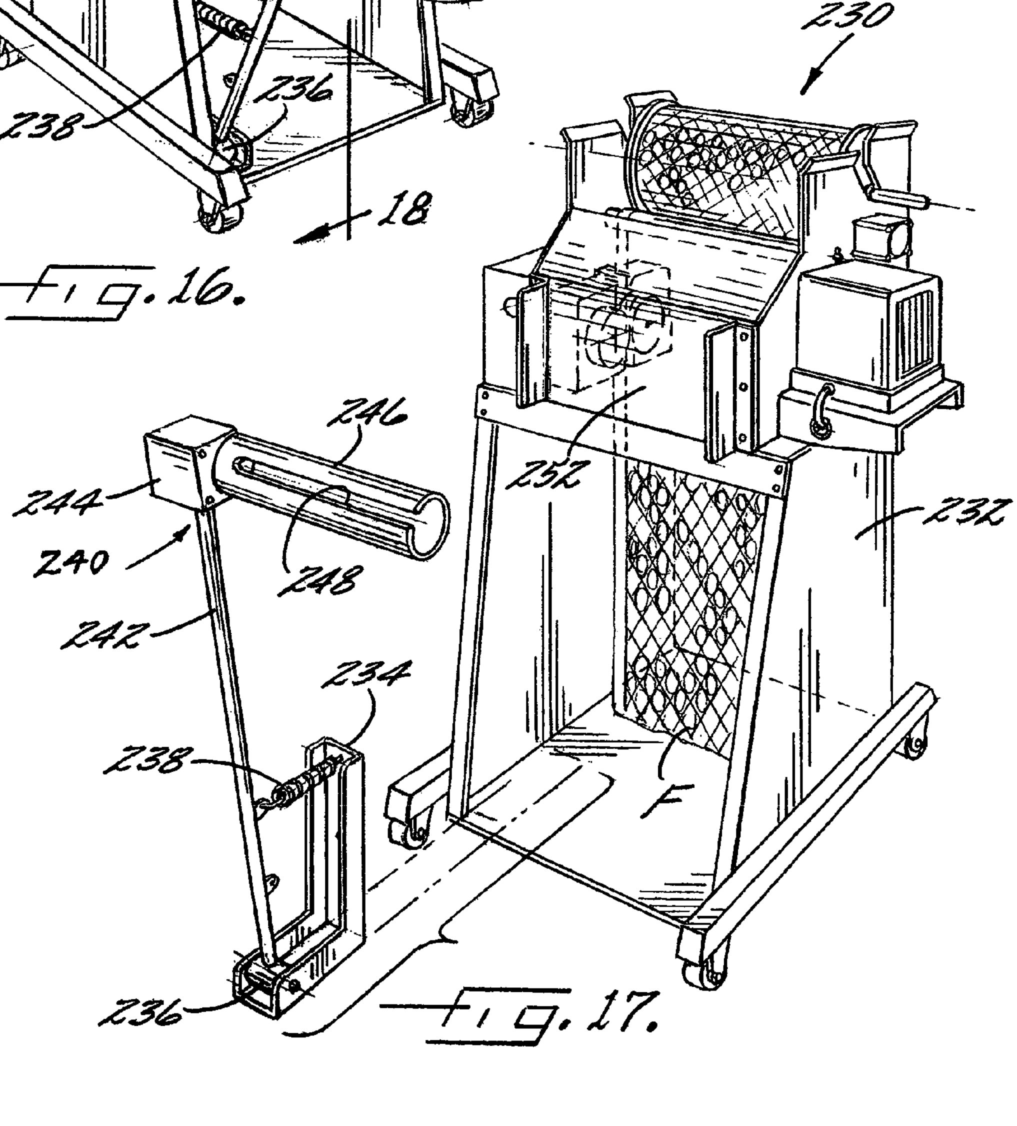
FIG. 17 is an exploded view of the apparatus of FIG. 16.

With reference to FIGS. 10 through 13 in particular, the web tracking system includes the previously described contact sensor 90 and tracking sensor 98 and the controller 100 that receives the signal from the tracking sensor 98, and the pneumatic cylinders 44. The air compressor 38 provides compressed air, which is reduced in pressure by a pressure relief valve 104 that lowers the pressure from about 7 psi output from the compressor to a pressure suitable for inflating the inflatable chambers of the web to the desired amount. The components of the control system are sized for this pressure, which is approximately 4 psi. The air supply tees off with one air supply line 68 feeding the inflation device and another air supply line 106 supplying air to a pneumatic valve 108 on the web tension roller 42, which in turn feeds a solenoid valve manifold 110 that contains a pair of three-way valves 112, 114 operated by solenoids 112*a*, 114*a*, respectively. The three-way valve 112 pressurizes the left-hand cylinder 44 when it solenoid is energized, and vents the cylinder to atmosphere (as shown in FIG. 13) when its solenoid is de-energized. Similarly, the three-way valve 114 pressurized the right-hand cylinder 44 when its solenoid is energized (as shown in FIG. 13), and vents the cylinder to atmosphere with the solenoid is de-energized.

The controller 100 receives the signal from the tracking sensor 98 indicating whether the switch is open or closed. When the switch closes, the web is tracking too far to the left, and the controller energizes the left solenoid 112*a* which feeds air to the left tracking cylinder 44, and de-energizes the solenoid 114*a* for the right tracking cylinder 44 so as to vent the air from the cylinder. This causes the web supply roll 36 to move slowly to the right on the spindle 34, at a speed that is controlled by one-way flow control valves (not shown) disposed between the three-way valves 112, 114 and the cylinders 44. As the web moves to the right, the tracking sensor follows it. When the sensor passes the tracking set point, the switch 98 opens and the controller detects the resulting change in the signal from the sensor. The controller then de-energizes the left solenoid and energizes the right solenoid. This causes the film roll to move to the left until the web once again passes the set point and the process repeats. The system is constantly hunting for the set point, which keeps the film web tracking within a range that allows the inflatable chambers of the web to be filled in a consistent manner.

A rounded member is attached to the end of the cylinder piston rod 45. The rounded member provides a consistent surface that presses against the supply roll, resulting in a controllable friction at the interface. As shown in FIG. 12, the piston rod pushes against the cardboard flange 37 of the film supply roll. Alternatively, a disk of plastic or another material can be placed over the flange, or the entire flange can be made from or laminated with such material to further control the amount of friction. In the current application, the cylinders 44 are chosen so that they produce approximately 12 pounds of force. To keep the supply roll from moving too quickly and overshooting the tracking position, a one-way control valve is placed into the pneumatic supply line as previously noted. This is a conventional device that allows the cylinder to move at full speed while being pressurized, but moves very slowly in the vent direction. An alternative to the one-way valve is to put a fixed orifice in the pneumatic supply line to limit the flow in both directions.

With this system, one or the other of the pneumatic cylinders 44 is always pressurized. This means that there is always friction on the supply roll that creates tension on the web. The correct tension is necessary for proper inflation and consistent tracking. The tension control roller 42 is shown in FIGS. 11A and 11B. The web unrolls from the bottom of the supply roll 36, then loops over the tension control roller 42 and into the drive head. In this manner, the web tension force presses downward on the tension control roller. The right end of the roller shaft is mounted to the frame of the apparatus in such a manner as to allow the left end of the shaft to move vertically and pivot the shaft and roller a small amount. The left end of the roller shaft protrudes through a slot in the frame and is captured between a spring 116 and the pneumatic valve 108. As noted above, the pneumatic valve 108 is located in the air supply line 106 that feeds air to the cylinders 44. When the web tension is low (FIG. 11B), the spring force holds the roller in its upper position, actuating the valve and allowing supply air to flow. As the tension builds, the downward force on the roller overcomes the spring force and the roller moves to its lower position (FIG. 11A), releasing the valve and stopping the flow of air. The pressure is now removed from both cylinders, which allows the web supply roll to rotate more freely and relieves the tension. When the tension now drops below the spring force, the roller 42 rises, actuates the switch and starts the process again. By choosing the correct spring, the force needed to overcome the spring can be set to produce the desired web tension. A spring force is approximately 4 lbs has been found to work well in one application.

An alternative embodiment of the invention is depicted in FIGS. 14, 14A, and 15. In this embodiment, the film edge guides that were part of the inflation device in the previous embodiment have been removed from the inflation device and incorporated into the drive head. Thus, the inflation device 148 comprises a mounting block 162 and an inflation vane 164, and a contact sensor 90 and tracking sensor 98 substantially as previously described. Mounted on the support plate 160 of the drive head are a pair of web guides 170, 172. The guides are flexible but stiff enough to put tension on the film web to straighten out any wrinkles in the film material. For example, the guide can be made from 1/16" thick polyethylene or other suitable material. As can be seen in FIG. 14A in particular, the distal end of the right side guide 172 extends approximately to the centerline of the web path. The distal end of the left side guide 170 extends past the centerline for the purposes described below.

More particularly, when a roll of inflatable web is manufactured, two plies are sealed together and wound around a roll. As the film plies are wound, the outboard ply must stretch slightly to compensate for the small difference in diameters between the inboard and outboard plies. The polymer web material sets in this way, so that when the film is unwound for inflation and sealing, the outboard ply is slightly longer than the inboard ply. In FIG. 14 and FIG. 14A, the left side ply is the inboard, shorter ply. Without the guides, the longer outboard ply must eventually fold over, or tuck, to compensate for the difference in lengths. When this happens, there are now three plies that pass through the sealing device. Since the seal temperature is optimized for two plies, a complete seal is not made. This results in a leak, and a deflated bubble row. The guides 170, 172, with their offset lengths, stretch the material as it passes so that both plies are the same length. This is done just before the film enters the drive wheels 52, 54 of the sealing device, so that the film does not have time to return to its previously set length. Since the plies are now the same length, the tucks are eliminated, as are the deflated rows.

Yet another embodiment of the invention is depicted in FIGS. 16, 17, 18A, and 18B. The apparatus 230 illustrated therein is generally similar to the apparatus 30 described above, except that instead of the inflated web material being dispensed into a collection bin 46 (FIG. 1), the inflated web is wound into a roll by using a winding device 240 incorporated into the apparatus. The winding device 240 includes a support arm 242 that is pivotally attached at its lower end to the apparatus frame 232 via a bracket 234 that rotatably supports a pivot pin 236 affixed to the lower end of the support arm. An extension spring 238 is connected between the bracket 234 and the support arm 242 at a location intermediate the lower end and upper end of the support arm. Affixed to the upper end of the support arm is a motor 244 whose rotatable drive shaft is affixed to a spindle 246 about which the inflated web material is wound as the motor rotates the spindle.

The spindle 246 is a hollow cylindrical tube that has an axial slot 248 in its wall, extending from the free end of the spindle for a length at least equal to the width of the inflated web material, such that an end of the inflated web (which end includes at least one row of inflated bubbles) can be inserted into the slot with the bubbles disposed inside the hollow spindle. The slot 248 is narrower than the thickness of the bubbles, such that once the end of the web material is engaged in the slot, it cannot readily be pulled out of the slot in a radially outward or tangential direction. The end of the material is thus attached to the spindle so that when the spindle begins to be rotated by the motor, the inflated web material is wound about the spindle to form a roll 250. When the roll 250 is completed, the slot 248 allows the free end of the inflated web and the roll to be axially slid off the spindle.

Figure 18B:
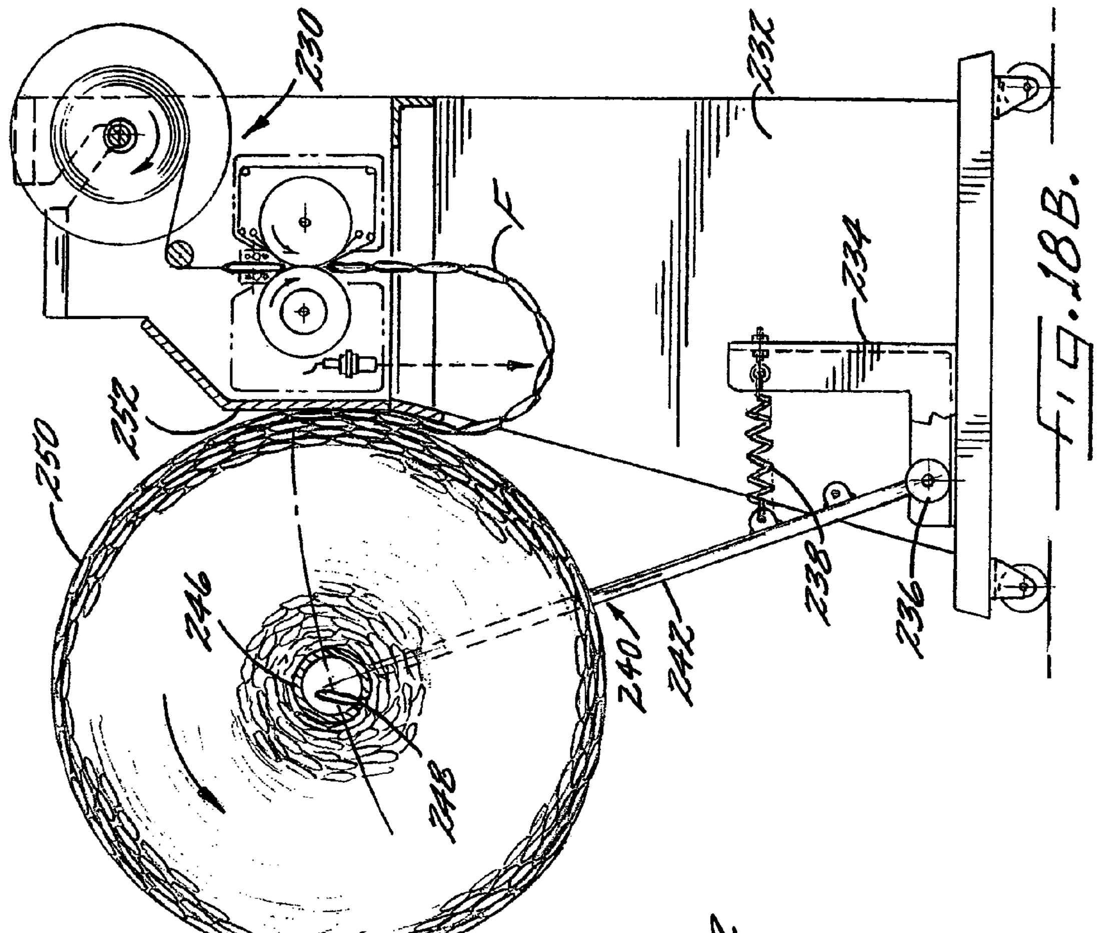
FIG. 18B shows the apparatus winding the inflated web material into a roll at a later point in time at which the roll has grown in diameter relative to FIG. 18A.
Figure 18A:
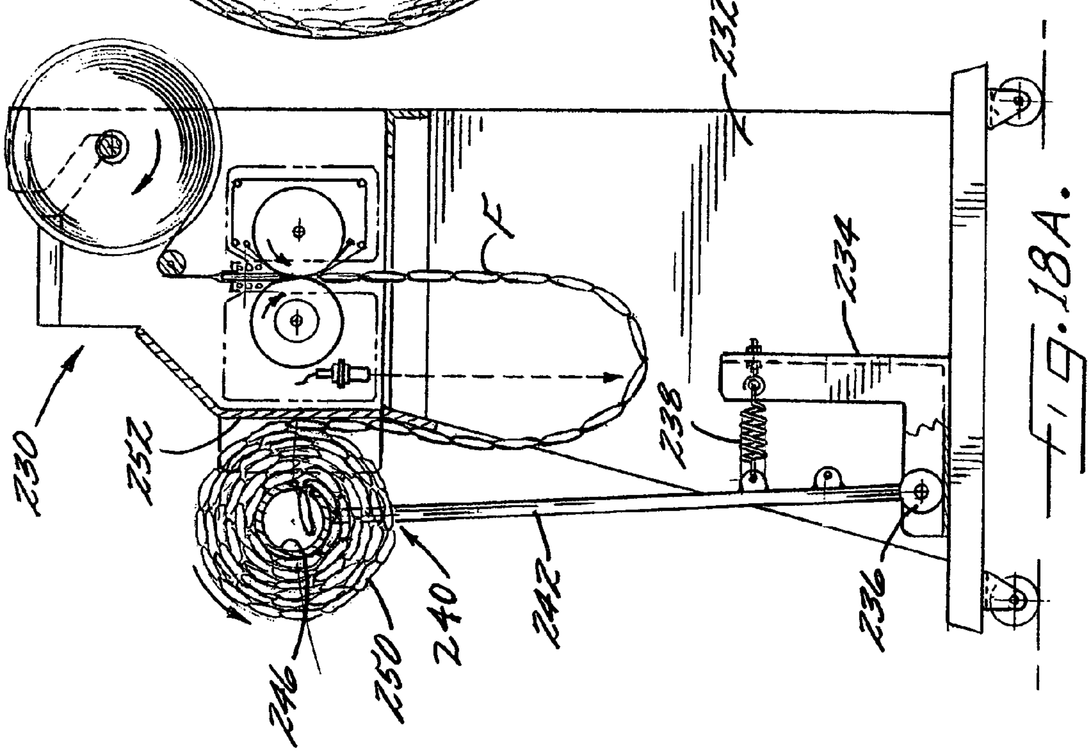
FIG. 18A shows the apparatus winding the inflated web material into a roll.

As the inflated web material accumulates on the spindle and the roll 250 grows in diameter, the weight of the roll increases, which tends to pivot the support arm 242 away from the apparatus (compare FIGS. 18A and 18B). Counteracting this pivoting movement of the support arm is the spring 238, which tends to pull the support arm toward the apparatus and urges the outer surface of the roll 250 against a surface 252 of the apparatus frame. The friction between the rotating roll 250 and the surface 252 creates tension in the inflated web material so that the roll is wound with a desired amount of radially acting residual compressive stress for maintaining good roll quality and stability. With suitable selection of the spring force of the spring 238, and with appropriate design of the relative dimensions of the various components of the winding device, it can be assured that the spring force tending to pivot the support arm 242 toward the apparatus exceeds the gravitational force tending to pivot the support arm 242 away from the apparatus by a generally constant amount. In this way, the winding tension can be maintained generally constant.

Figure 19:
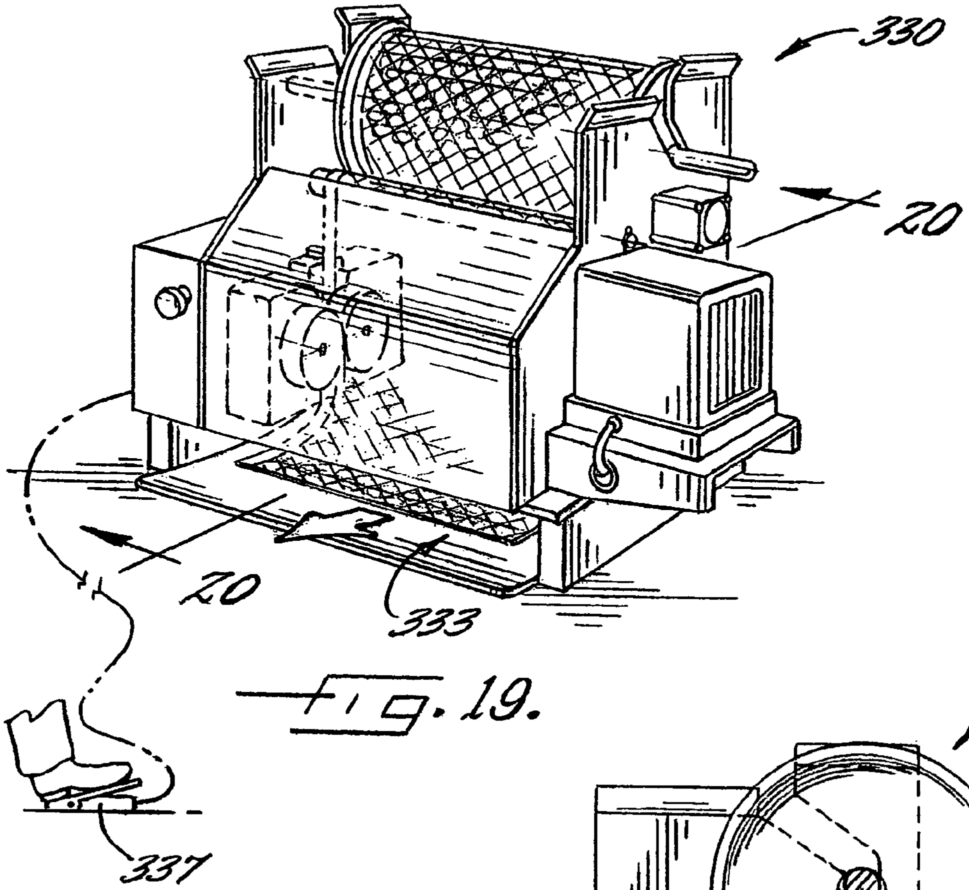
FIG. 19 illustrates a compact or table-top apparatus in accordance with yet another embodiment of the invention.
Figure 20:
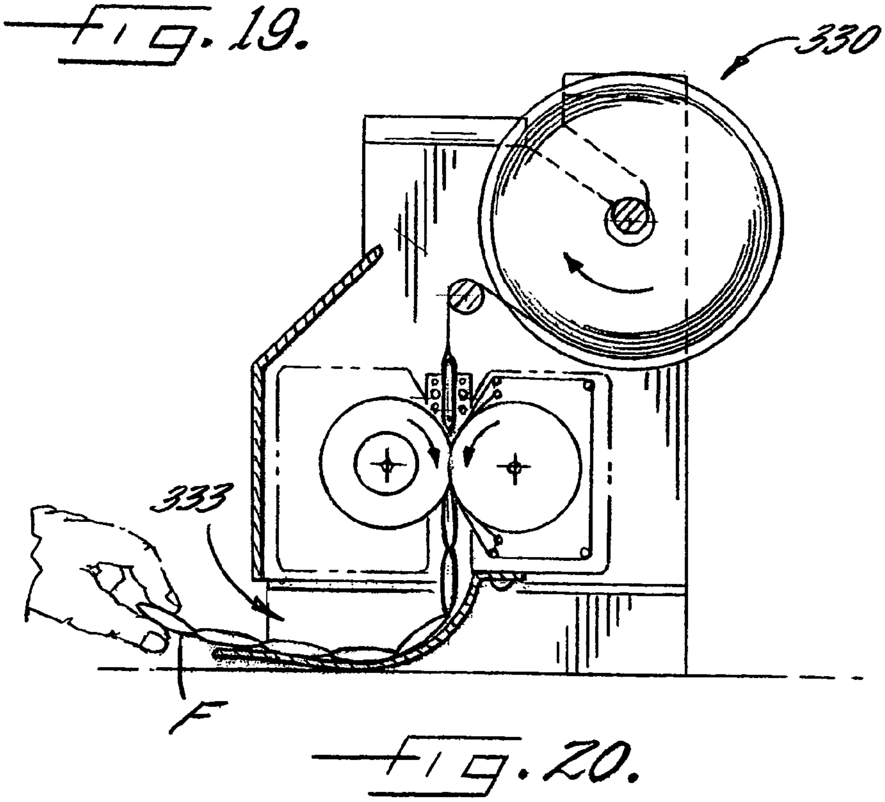
FIG. 20 is a cross-sectional view along line 20-20 in FIG. 19.
Figure 23:
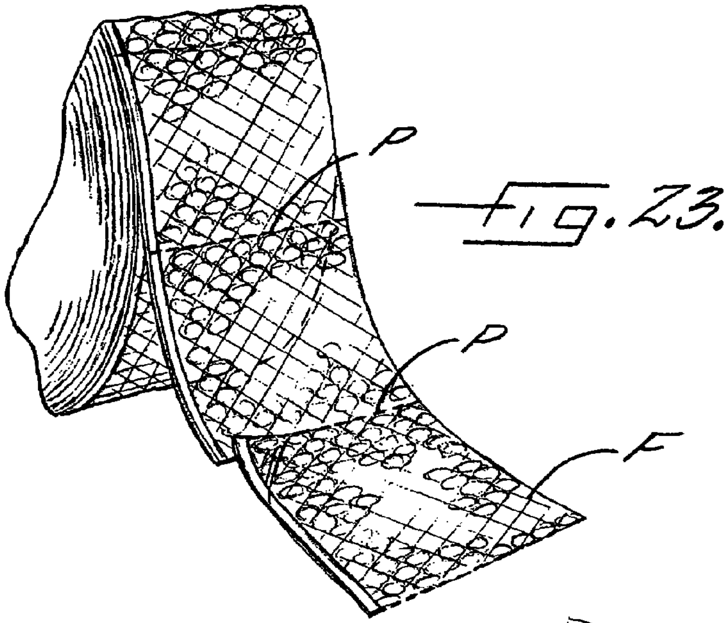
FIG. 23 shows a roll of inflatable web material having pre-formed perforations at regular intervals.
Figure 24:
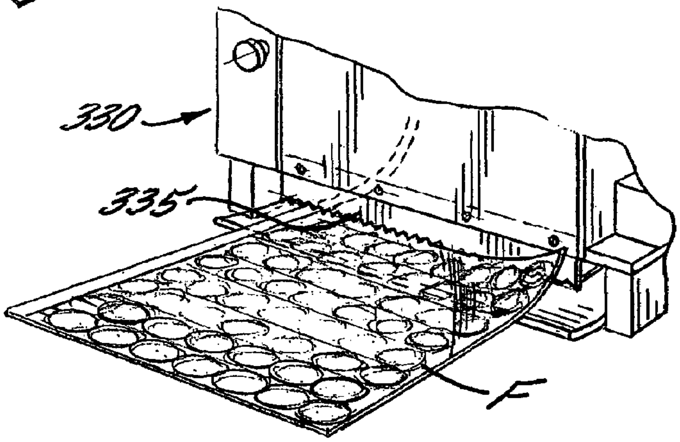
FIG. 24 shows an apparatus in accordance with a further embodiment of the invention, having a cutoff knife for severing a desired length of non-perforation inflated web material.
Figure 25:
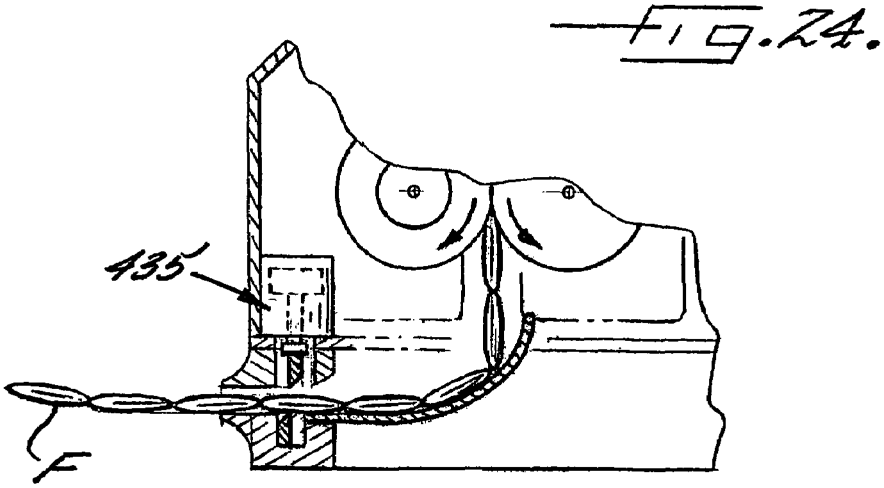
FIG. 25 illustrates an apparatus in accordance with a still further embodiment of the invention, having an automated cutoff device.

A further embodiment of the invention is shown in FIGS. 19 and 20. The apparatus 330 shown therein is generally similar to the apparatus 30 already described, except that the apparatus 330 is a compact or "table-top" apparatus designed to be used without any collection bin or winding device. Instead, the apparatus 330 defines a discharge opening 333 from which the inflated web material issues. The web material can include pre-formed perforations P (FIG. 23) at defined intervals along its length so that the inflated web material can be torn off in any length that is a multiple of the spacing distance between perforations. Alternatively, if the web material does not include perforations, then the apparatus can include a cutoff device such as a serrated knife 335 (FIG. 24) against which the material can be pulled to sever a length of the material, or can include an automated cutoff device 435 (FIG. 25) such as a reciprocating knife actuated by a pneumatic cylinder or other suitable device for severing the web. The apparatus 330 of FIG. 19 can also include a foot-operated switch 337 or the like for alternately operating the apparatus or ceasing operation of the apparatus to make inflated web material.

Figure 21:
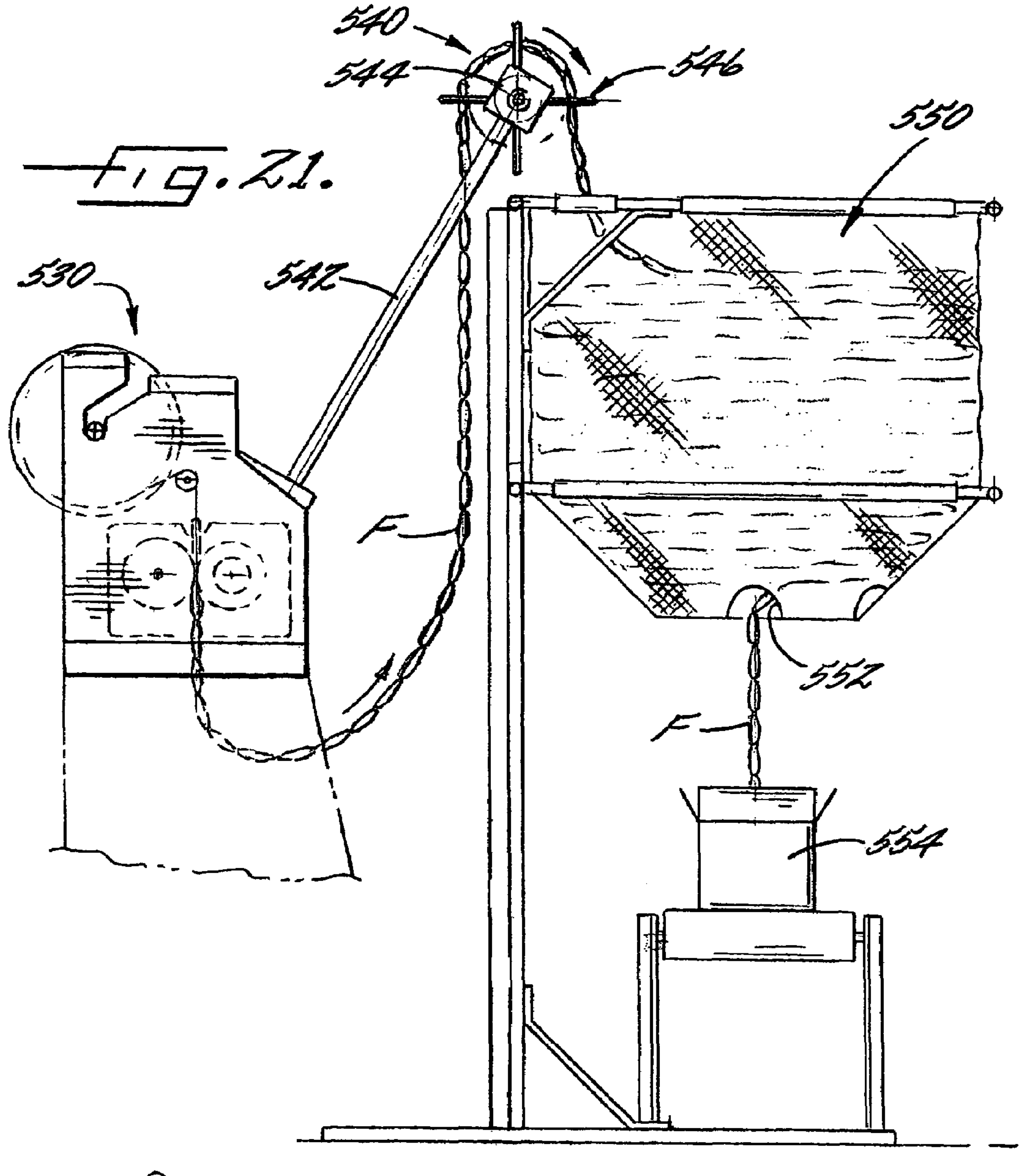
FIG. 21 shows an apparatus in accordance with still another embodiment of the invention.
Figure 22:
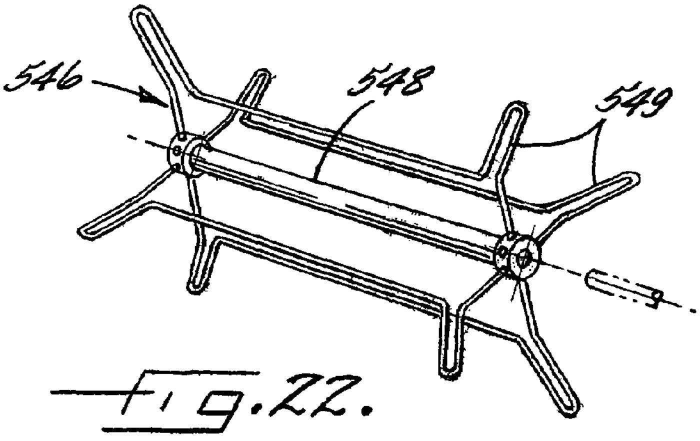
FIG. 22 depicts a transfer roller for use in the apparatus of FIG. 21.

A still further embodiment of the invention is depicted in FIGS. 21 and 22. The apparatus 530 shown therein is generally similar to the apparatus 30 described above, except that instead of the inflated web material being collected in a bin located in or adjacent to the apparatus, the apparatus includes a web transfer device 540 for transferring the continuous web to another location remote from the apparatus. For instance, the web transfer device can transfer the web into a collection hopper 550 that is open at the top and is generally closed at the bottom except for a discharge opening 552 from which the web material exits as needed. As an example, and as illustrated in FIG. 21, the inflated web material can be drawn out from the discharge opening of the hopper and placed into a carton 554 being packed for shipment.

The web transfer device 540 comprises a support arm 542 rigidly affixed at its lower end to the frame of the apparatus 530 and having a motor 544 mounted on its upper end. The rotatably driven output shaft of the motor is connected to a web transfer roller 546, one embodiment of which is shown in detail in FIG. 22. The web transfer roller comprises a central shaft 548 and a wire cage structure 549 affixed to the central shaft. The cage structure includes a plurality of circumferentially spaced, axially extending members that are at least as long as the width of the inflated web material and that engage the inflated web material as the transfer roller is rotated about the axis of the central shaft so that the web material is conveyed by the roller. The cage structure also has generally radially extending portions at the opposite ends of the axially extending members that serve to keep the web material from creeping off one end or the other end of the transfer roller. Other structures for the transfer roller can be used instead, the invention not being limited in that respect.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for inflating an inflatable web, the inflatable web comprising two sheets having inner surfaces sealed to each other with intermittent seals defining a series of inflatable chambers, the inflatable web having opposite longitudinal edges, each inflatable chamber having an inflation port adjacent one of the longitudinal edges, the intermittent seals terminating a distance from one edge of the web to form an unsealed edge portion or skirt of the web, the method comprising the steps of:

conveying the inflatable web along a path of travel substantially parallel to the longitudinal edges of the inflatable web;

positioning an inflation device comprising an inflation element such that the inflation element intervenes between the edge portions of the two sheets, and discharging gas from the inflation element into each inflation port in turn as the inflatable web is conveyed along the path of travel such that each inflatable chamber is inflated with gas;

sealing the two sheets together to seal closed the inflation ports after inflation of the inflatable chambers by the inflation device;

detecting the transverse position of the inflatable web with respect to the inflation device using a tracking sensor having a contact sensor that is movable along the transverse direction of the web and is positioned between the sheets of the skirt and arranged to be contacted by ends of the intermittent seals as the inflatable web is conveyed, the contact sensor retaining contact with the ends of the intermittent seals and moving transversely in response to transverse movement of the web; and continually adjusting a transverse position of the inflatable web with respect to the inflation, on the basis of an output of the tracking sensor, device so as to maintain said transverse position within a predetermined range.

2. An apparatus for inflating an inflatable web, the inflatable web comprising two sheets having inner surfaces sealed to each other with intermittent seals defining a series of inflatable chambers, the inflatable web having opposite longitudinal edges, each inflatable chamber having an inflation port adjacent one of the longitudinal edges, the intermittent seals terminating a distance from one edge of the web to form an unsealed edge portion or skirt of the web, the apparatus comprising:

a web conveying system for conveying the inflatable web along a path of travel substantially parallel to the longitudinal edges of the inflatable web;

an inflation device comprising an inflation element arranged to intervene between the sheets of the skirt, the inflation element defining a gas outlet port through which gas is discharged into each inflation port in turn as the inflatable web is conveyed along the path of travel;

a sealing device for sealing the two sheets together to seal closed the inflation ports after inflation of the inflatable chambers by the inflation device;

the inflation device comprising a tracking sensor operable to detect the transverse position of the inflatable web with respect to the inflation device, the tracking sensor including a contact sensor movable along the transverse direction of the web and positioned between the sheets of the skirt and arranged to be contacted by ends of the intermittent seals as the inflatable web is conveyed, the contact sensor retaining contact with the ends of the intermittent seals and moving transversely in response to transverse movement of the web; and a web tracking system which is, on the basis of the output of the tracking sensor, structured and arranged to continually adjust a transverse position of the inflatable web with respect to the inflation device so as to maintain said transverse position within a predetermined range.

3. The apparatus of claim 1, wherein the apparatus includes a roll mounting arrangement structured and arranged for rotatably mounting a roll of the inflatable web such that the roll is movable back and forth in opposite first and second directions, respectively, parallel to a rotation axis of the roll, and wherein the web tracking system is structured and arranged to position the roll of the inflatable web in said first and second directions, thereby effecting adjustment of the transverse position of the inflatable web.

4. The apparatus of claim 3, wherein the web tracking system comprises a first actuator structured and arranged to apply a force in said first direction to a first end of the roll of inflatable web.

5. The apparatus of claim 4, wherein the web tracking system further comprises a second actuator structured and arranged to apply a force in said second direction to a second end of the roll of inflatable web.

6. The apparatus of claim 5, wherein the web tracking system further comprises a controller structured and arranged to command one or the other of the first and second actuators to adjust the position of the roll of inflatable web in the first or second direction.

7. The apparatus of claim 6, wherein the first and second actuators comprise pneumatic cylinders, and the web tracking system further comprises a controllable valve receiving pressurized air from a source and selectively positionable in either a first position in which the valve supplies air to the first actuator or a second position in which the valve supplies air to the second actuator.

8. The apparatus of claim 7, further comprising an air-operated web tension control device that receives pressurized air from the source and acts on the inflatable web to regulate tension thereof.

9. The apparatus of claim 1, wherein the inflation device comprises a pair of guides between which the edge portions of the two sheets are received.

10. The apparatus of claim 9, wherein the inflation element is positioned between the guides such that the edge portion of one sheet passes through a channel defined between one guide and one side of the inflation element and the edge portion of the other sheet passes through another channel between the other guide and an opposite side of the inflation element.

11. The apparatus of claim 1, wherein the inflation element is shaped generally as a vane.

12. An apparatus for inflating an inflatable web, the inflatable web comprising two sheets having inner surfaces sealed to each other in a pattern defining a series of inflatable chambers, the inflatable web having opposite longitudinal edges, each inflatable chamber having an inflation port adjacent one of the longitudinal edges, the inflation ports being defined by intermittent seals between the two sheets, and the two sheets having unsealed edge portions that extend beyond the inflation ports of the inflatable chambers, the apparatus comprising:

a web conveying system for conveying the inflatable web along a path of travel substantially parallel to the longitudinal edges of the inflatable web;

an inflation device comprising an inflation element arranged to intervene between the edge portions of the two sheets, the inflation element defining a gas outlet port through which gas is discharged into each inflation port in turn as the inflatable web is conveyed along the path of travel;

a sealing device for sealing the two sheets together to seal closed the inflation ports after inflation of the inflatable chambers by the inflation device; and a web tracking system structured and arranged to continually adjust a transverse position of the inflatable web with respect to the inflation device so as to maintain said transverse position within a predetermined range;

wherein the inflation device comprises a pair of guides between which the edge portions of the two sheets are received, wherein the inflation element is positioned between the guides such that the edge portion of one sheet passes through a channel defined between one guide and one side of the inflation element and the edge portion of the other sheet passes through another channel between the other guide and an opposite side of the inflation element; and wherein the guides are mounted on the inflation device so as to be movable toward and away from each other between a web-threading position in which the guides are spaced relatively farther apart and the channels are relatively wide to facilitate threading of the edge portions through the channels, and a production position in which the guides are spaced relatively closer together and the channels are relatively narrow.

13. An apparatus for inflating an inflatable web, the inflatable web comprising two sheets having inner surfaces sealed to each other in a pattern defining a series of inflatable chambers, the inflatable web having opposite longitudinal edges, each inflatable chamber having an inflation port adjacent one of the longitudinal edges, the inflation ports being defined by intermittent seals between the two sheets, and the two sheets having unsealed edge portions that extend beyond the inflation ports of the inflatable chambers, the apparatus comprising:

a web conveying system for conveying the inflatable web along a path of travel substantially parallel to the longitudinal edges of the inflatable web;

an inflation device comprising an inflation element arranged to intervene between the edge portions of the two sheets, the inflation element defining a gas outlet port through which gas is discharged into each inflation port in turn as the inflatable web is conveyed along the path of travel;

a sealing device for sealing the two sheets together to seal closed the inflation ports after inflation of the inflatable chambers by the inflation device; and a web tracking system structured and arranged to continually adjust a transverse position of the inflatable web with respect to the inflation device so as to maintain said transverse position within a predetermined range; and wherein the inflation element defines an internal passage extending therethrough that has an opening facing the intermittent seals of the inflatable web, and wherein the tracking system comprises a contact sensor element movably mounted in the internal passage and protruding out from the opening, the contact sensor element being arranged to be contacted by ends of the intermittent seals such that a position of the contact sensor element indicates the transverse position of the inflatable web.

14. The apparatus of claim 13, further comprising a position sensor mounted proximate the contact sensor element and operable to detect the position of the contact sensor element.

15. The apparatus of claim 14, wherein the position sensor comprises an optical sensor.

* * * * *